Patented Dec. 29, 1925.

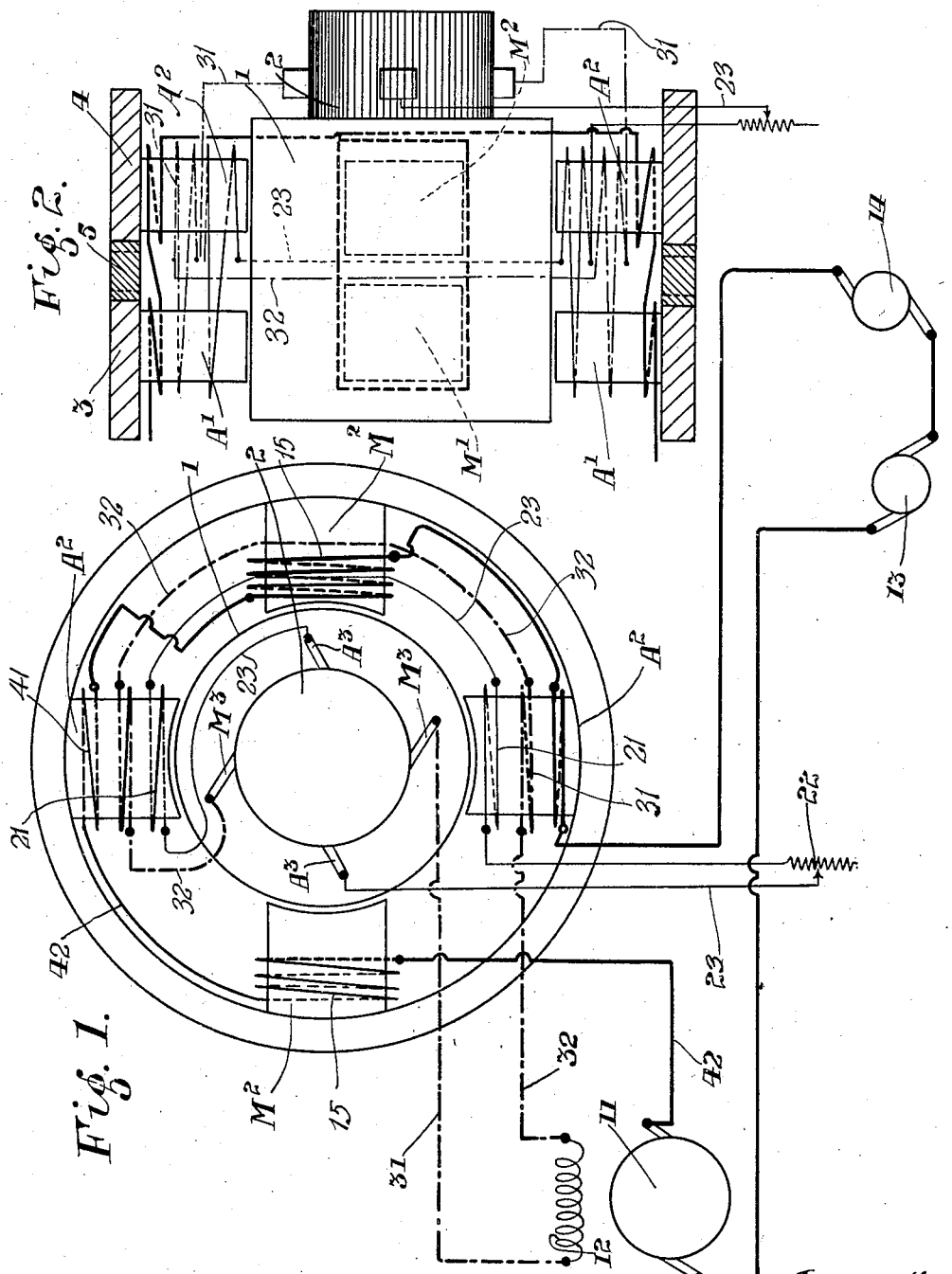

1,567,890

UNITED STATES PATENT OFFICE.

GILBERT AUSTIN, JAMES COLQUHOUN MACFARLANE, AND WILLIAM ALLAN MACFARLANE, OF GLASGOW, SCOTLAND.

ELECTRIC GENERATING PLANT FOR CONSTANT-CURRENT SYSTEMS.

Application filed October 13, 1924. Serial No. 743,469.

*To all whom it may concern:*

Be it known that GILBERT AUSTIN, 10 Calderwood Road, Newlands, Glasgow, Scotland, JAMES COLQUHOUN MACFARLANE, Braehead, Cathcart, Glasgow, Scotland, and WILLIAM ALLAN MACFARLANE, Alderwood, Cathcart, Glasgow, Scotland, subjects of the King of Great Britain, have invented certain new and useful Improvements in Electric Generating Plants for Constant-Current Systems, of which the following is a specification.

The present invention relates to electric generating plant for constant current systems.

The objects of the invention are:—

(1) To provide electric power plant designed to respond with such extreme rapidity to sudden and heavy changes in the load that close regulation of the line current becomes possible when supplying power to motors operating violently regenerative loads;

(2) To make use of generators of standard design for this purpose; and (3) To effect the foregoing without the use of moving brush gear which is usually employed on constant current systems and which does not act rapidly enough for the loads described.

For the purpose of our invention we employ a generator of standard design suitable for supplying the necessary current at any voltage from zero to the maximum in either a positive or negative direction with fixed brush positions. The generator has separately excited field windings, and the entire voltage control is effected by varying the strength and direction of the current in these coils. This current is obtained from a separate exciter of novel design and construction, preferably driven by the generator shaft, to which exciter this invention more particularly relates.

Exciters of the type having a field winding excited differentially by a current received from a source of constant voltage on the one hand, and from the line generator on the other hand, have been used; but due to the mutual induction between these two field windings of the exciter, and to the self-induction induced by the generator fields, the action is not sufficiently rapid for the present purpose.

According, therefore, to the present invention there is provided an exciter having a single armature, main poles and auxiliary poles, main brushes and auxiliary brushes, field windings on the main poles in series with the main line circuit or with a portion thereof, and two separate windings on the auxiliary poles, these two windings being (a) an "exciting" winding connected to the auxiliary brushes of the exciter, and (b) a "compensating" winding connected in series with the main brushes of the exciter and with the field winding of the generator and arranged to assist the "exciting" winding. In addition there may be a third winding, namely (c) a "stabilizing" winding in series with the main line circuit and arranged to oppose the "exciting" and "compensating" windings. Preferably, the auxiliary poles will be split longitudinally into two parts and the "stabilizing" winding will be wound round each part separately and reversely, so that one part is assisting and the other part opposing the action of the "exciting" and the "compensating" windings. There may be a regulating resistance in series with the "exciting" winding and the main poles and yoke may be split into two parts, the latter being separated by a ring of non-magnetic material.

The invention will now be described with reference to the accompanying drawings as embodied in an exciter of the bi-polar type.

In the drawings:—

Fig. 1 is a diagrammatic end elevation of the exciter showing the various connections, and Fig. 2 is a diagrammatic longitudinal elevation in section of the exciter.

The exciter comprises an armature 1 having a commutator 2; the yoke is divided into two portions 3 and 4 by means of a ring 5 of non-magnetic material; there are two main poles each preferably arranged in two portions $M^1$, $M^2$, and two auxiliary poles which are divided into two portions $A^1$ and $A^2$; there are two sets of main brushes $M^3$ and two sets of auxiliary brushes $A^3$. The generator 11 is indicated with its field 12 and is shown as connected to motors 13 and 14.

It will be seen that the field winding 15 of each main pole is in series with the armature of the generator 11 and the main line circuit to the motors 13 and 14. The auxiliary poles are provided with three separate windings; the first winding 21 is known as the "exciting" winding and is connected by a conductor 23 through a regulating resistance 22 to the auxiliary brushes A³; the second winding 31 is known as the "compensating" winding and is connected by a conductor 32 in series with the main brushes M³ of the exciter and also with the field winding 12 of the generator and is arranged to assist the "exciting" winding; the third winding 41 is called the "stabilizing" winding and is connected by conductors 42 in series with the generator main circuit and with the field winding upon the main poles M¹, M².

The "exciting" and "compensating" windings 21, 31 embrace the whole auxiliary pole but the "stabilizing" winding is wound round each part A¹ and A² separately, one part assisting the "exciting" and "compensating" windings and the other part opposing them.

The use of the windings will now be considered, ignoring, in the first instance, the splitting of the auxiliary poles and assuming that the whole of the "stabilizing" winding is in opposition to the other two windings. Currents flowing from the main brushes M³ and the auxiliary brushes A³ will create M. M. F.'s (magneto-motive-forces) in the armature of the exciter in a direction in line with their respective brushes; the construction of the exciter and the connection of the windings are such that the M. M. F. in line with the main brushes M³ will directly oppose the M. M. F. produced by the "exciting" winding 21 on the auxiliary poles and the M. M. F. in line with the auxiliary brushes A³ will directly oppose the M. M. F. produced by the winding on the main poles which winding carries the line current from the generator.

As the M. M. F. due to armature re-action (produced by the current from the exciter main brushes M³ which current also flows in the field of the generator) will have a harmful effect, it is compensated by means of the "compensating" winding 31 on the auxiliary poles which winding carries the current from the main exciter brushes M³, this "compensating" winding being so connected as to assist the "exciting" winding 21. It is clear that if the "compensating" winding is so proportioned as to over-compensate for the armature re-action M. M. F., a compounding effect will be obtained in the generator, that is, the line current will increase with an increase in load, owing to the increased armature re-action M. M. F. in line with the auxiliary brushes A³.

If in addition to the "exciting" and "compensating" windings a third or "stabilizing" winding 41 is placed on the auxiliary poles and carries the line current and is connected to oppose the "exciting" and "compensating" windings, then the rapidity of regulation of the exciter will be considerably enhanced for the following reasons:—

Assuming the current flowing in the line to be of such value that the M. M. F. produced in the exciter main poles M¹, M² almost balances the armature re-action M. M. F. due to the auxiliary brush current, then there will be practically no flux in the main poles M¹, M², and therefore only the very small voltages required to excite the generator fields under short circuited line conditions will appear at the exciter main brushes M³. If, however, the line current falls slightly, a three-fold effect will be produced tending to increase the exciter main field flux and, therefore, the field of the generator as follows:—

(a) The armature re-action M. M. F. in line with the auxiliary brushes becomes greater than the M. M. F. due to the exciter main poles, thus producing a residual M. M. F. in favour of the armature.

(b) The opposing M. M. F. due to the "stabilizing" winding on the auxiliary poles is reduced, thus further increasing the residual M. M. F. of (a) by increasing the auxiliary brush current.

(c) Due to the increase of the auxiliary brush current and the corresponding increase of the "exciting" M. M. F. on the auxiliary poles, the auxiliary brush current is further increased, thus resulting in a still greater increase of the residual M. M. F. of (a).

This three-fold effect is obtained with a considerable reduction of the undesirable mutual induction effect previously referred to. If the "stabilizing" windings be omitted, the actions described above under (b) and (c) would not take place, and the effect would be limited to the action described under (a) alone, which might be sufficiently rapid for ordinary non-regenerative loads.

It will, of course, be readily understood that the foregoing effects operate in the reverse direction if the line current be increased instead of being reduced.

The reason for the splitting of the auxiliary poles will now be described.

The foregoing construction is effective under ordinary conditions of loading the motors but in the event of a sudden great increase in the line current (which might take place when the load is regenerating excessively) the arrangement just described might become unstable and the exciter auxiliary poles might have their magnetism reversed. To prevent this possibility the auxiliary poles are divided in the manner previously described and the "stabilizing" coils (which carry the line current) embrace each part separately and are connected up in such a way that their M. M. F.'s act in opposite directions; the "exciting" and the "compensating" windings will embrace the whole pole as already stated. This will result in the M. M. F.'s of the "exciting" and "compensating" windings being assisted by the "stabilizing" winding on one part pole and being opposed by the "stabilizing" winding upon the other part pole.

As the cumulative effect of the three windings acting together on one part pole will be to magnetize that part to a high density, any small alteration in the value of the "stabilizing" current will make very little difference in the ultimate magnetic flux produced in that part of the pole, but as the effect of the "stabilizing" winding on the other part pole will be practically to neutralize the magnetism produced by the other windings, the permeability will be very high and the slightest alteration in the value of the "stabilizing" current will have a powerful influence in producing or permitting the other coils to produce magnetic flux in this part pole.

In order to ensure that the opposing winding of the "stabilizing" coil will not reverse the polarity of the auxiliary poles as a whole, the magnetic conductance of the part pole which carries the opposing winding will preferably be made less than that of the other part pole.

To obtain quick action under all conditions the main magnetic field of the exciter must remain in a quite unsaturated condition magnetically, even when supplying full field current to the generator, because this enables the exciter, under rapid fluctuations of the load, to overshoot in every case the E. M. F. required for the new stable conditions of the generator field.

To prevent sparking of the exciter certain conditions should be satisfied. In a bi-polar construction the armature winding will preferably be made fractional in pitch, so that the coils under commutation by the exciter main and auxiliary brushes will be situated in the gaps between the main and the auxiliary poles, the most suitable arrangement for the construction described being a 50% span to permit of a symmetrical displacement of the main and auxiliary brushes at 90% from each other.

Having now fully described our invention what we claim and desire to secure by Letters Patent is:—

1. An exciter for use with electric generating plant for constant current systems comprising a single armature; main poles; auxiliary poles; main brushes and auxiliary brushes; a field winding on the main poles adapted to be connected in series with the main line circuit of the generating plant; an "exciting" winding on the auxiliary poles connected to said auxiliary brushes; and a "compensating" winding on the auxiliary poles connected in series with the main brushes of the exciter and arranged to assist the "exciting" winding.

2. An exciter for use with electric generating plant for constant current systems comprising a single armature; main poles; auxiliary poles; main brushes and auxiliary brushes; a field winding on the main poles adapted to be connected in series with the main line circuit of the generating plant; an "exciting" winding on the auxiliary poles connected to said auxiliary brushes; a "compensating" winding on the auxiliary poles connected in series with the main brushes of the exciter and arranged to assist the "exciting" winding; and a "stabilizing" winding on the auxiliary poles adapted to be connected in series with the main line and arranged to oppose the "exciting" and the "compensating" windings.

3. An exciter for use with electric generating plant for constant current systems comprising a single armature; main poles; two part auxiliary poles; main brushes and auxiliary brushes; a field winding on the main poles adapted to be connected in series with the main line circuit of the generating plant, an "exciting" winding on the auxiliary poles connected to said auxiliary brushes; a "compensating" winding on the auxiliary poles connected in series with the main brushes of the exciter and arranged to assist the "exciting" winding; and a "stabilizing" winding wound around each part of the auxiliary poles separately and reversely so that one part assists and the other opposes the action of the "exciting" and the "compensating" windings, said "stabilizing" winding being arranged to be connected in the main line circuit.

4. An exciter for use with electric generating plant for constant current systems comprising a single armature; two part main poles; a two piece yoke, one part of said yoke carrying one part of the main poles; a spacing member of non-magnetic material between said yoke pieces; auxiliary poles; main brushes and auxiliary brushes; a field winding on the main poles adapted to be connected in series with the main line circuit of the generating plant; an "exciting" winding on the auxiliary poles connected to said auxiliary brushes; and a "compensating" winding on the auxiliary poles connected in series with the main brushes of the exciter and arranged to assist the "exciting" winding.

5. An exciter for use with electric generating plant for constant current systems comprising a single armature; two part main poles; a two piece yoke, one part of said yoke carrying one part of the main poles; a spacing member of non-magnetic material between said yoke pieces; auxiliary poles; main brushes and auxiliary brushes;

a field winding on the main poles adapted to be connected in series with the main line circuit of the generating plant; an "exciting" winding on the auxiliary poles connected to said auxiliary brushes; a "compensating" winding on the auxiliary poles connected in series with the main brushes of the exciter and arranged to assist the "exciting" winding; and a "stabilizing" winding on the auxiliary poles adapted to be connected in series with the main line and arranged to oppose the "exciting" and the "compensating" windings.

6. An exciter for use with electric generating plant for constant current systems comprising a single armature; two part main poles; a two piece yoke, one part of said yoke carrying one part of the main poles; a spacing member of nonmagnetic material between said yoke pieces; two part auxiliary poles; main brushes and auxiliary brushes; a field winding on the main poles adapted to be connected in series with the main line circuit of the generating plant, an "exciting" winding on the auxiliary poles connected to said auxiliary brushes; a "compensating" winding on the auxiliary poles connected in series with the main brushes of the exciter and arranged to assist the "exciting" winding; and a "stabilizing" winding wound around each part of the auxiliary poles separately and reversely so that one part assists and the other opposes the action of the "exciting" and the "compensating" windings, said "stabilizing" winding being arranged to be connected in the main line circuit.

7. An exciter for use with electric generating plant for constant current systems comprising a single armature; main poles; two part auxiliary poles, the magnetic conductance of one part pole being less than that of the other part pole; main brushes and auxiliary brushes; a field winding on the main poles adapted to be connected in series with the main line circuit of the generating plant; and "exciting" winding on the auxiliary poles connected to said auxiliary brushes; a "compensating" winding on the auxiliary poles connected in series with the main brushes of the exciter and arranged to assist the "exciting" winding and a "stabilizing" winding wound around each part of the auxiliary poles separately, the winding on the pole of greater magnetic conductance assisting the "exciting" and the "compensating" windings and that around the pole of lesser magnetic conductance opposing said windings, said "stabilizing" winding being arranged to be connected in the main line circuit.

In testimony whereof we affix our signatures.

GILBERT AUSTIN.
JAMES COLQUHOUN MACFARLANE.
WILLIAM ALLAN MACFARLANE.